Oct. 6, 1942.  E. C. BALLMAN  2,297,936
VARIABLE SPEED DRIVE
Filed Jan. 2, 1940   3 Sheets-Sheet 1
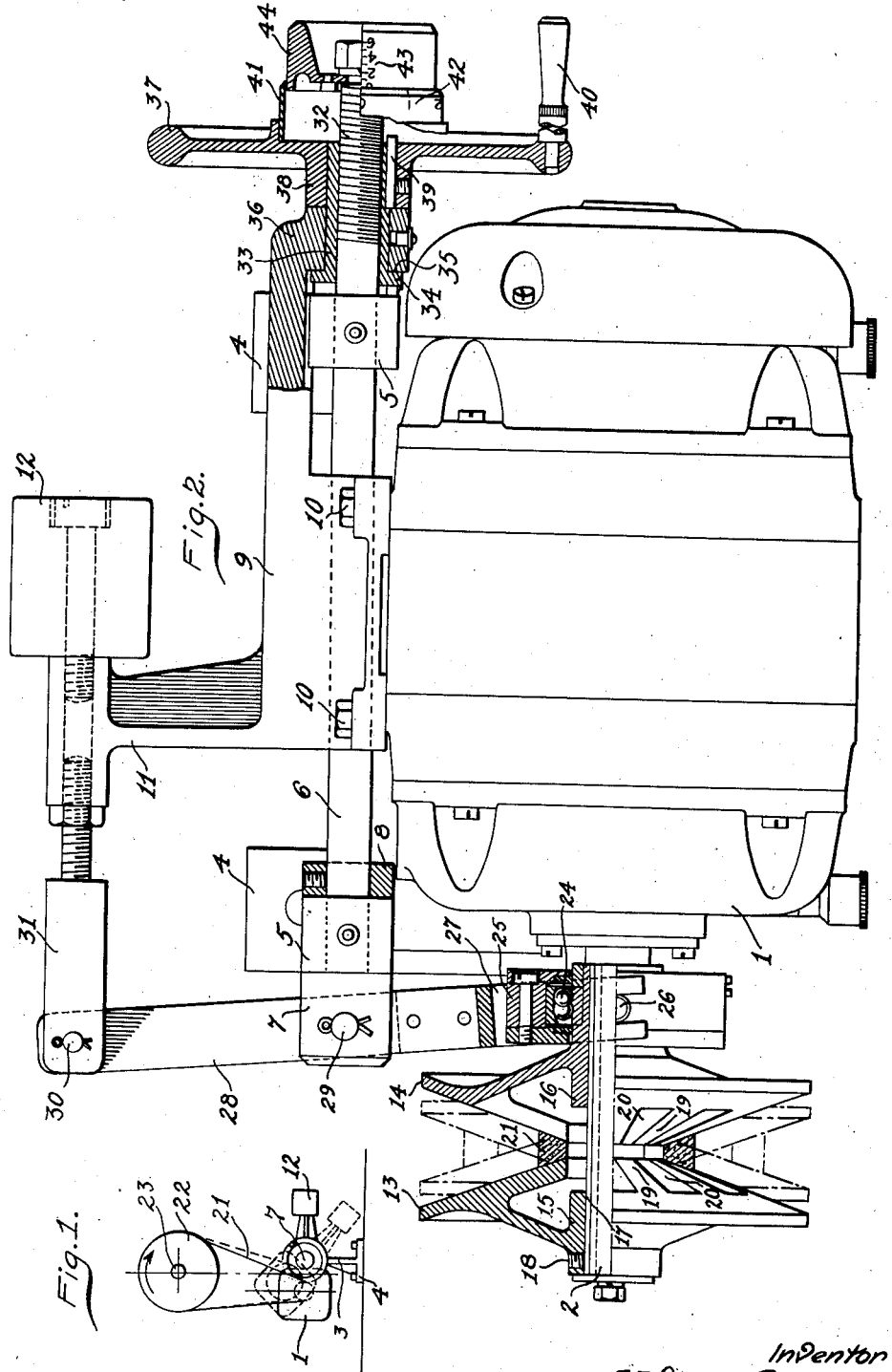
Inventor
Edwin C. Ballman
Bruninga & Sutherland
His Attorneys.

Oct. 6, 1942.  E. C. BALLMAN  2,297,936
VARIABLE SPEED DRIVE
Filed Jan. 2, 1940  3 Sheets-Sheet 2
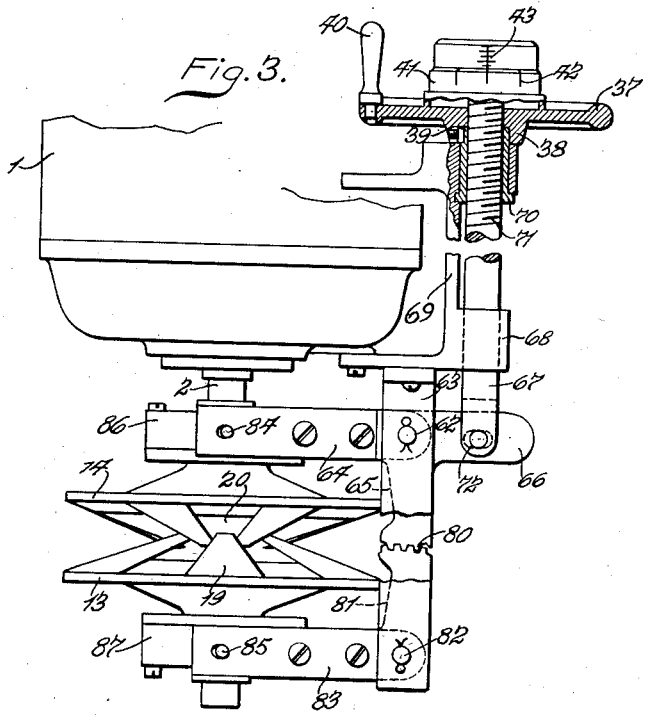
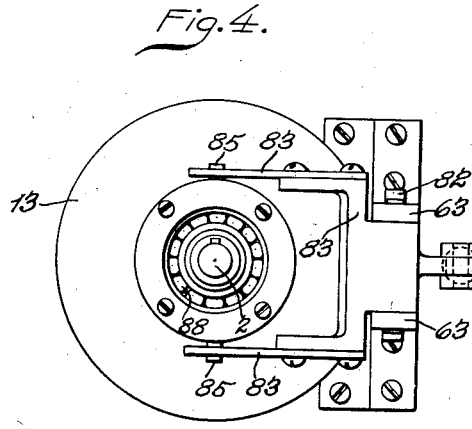
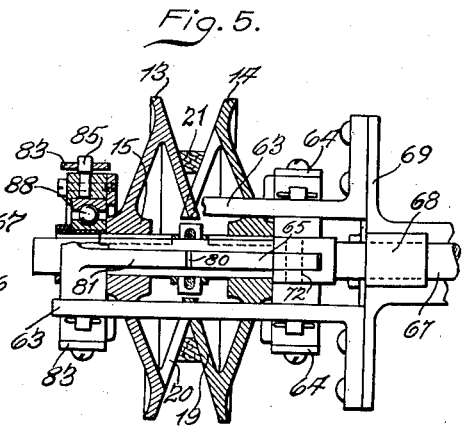
Inventor
Edwin C. Ballman
Bruninga & Sutherland
His Attorneys.

Oct. 6, 1942.  E. C. BALLMAN  2,297,936
VARIABLE SPEED DRIVE
Filed Jan. 2, 1940   3 Sheets-Sheet 3
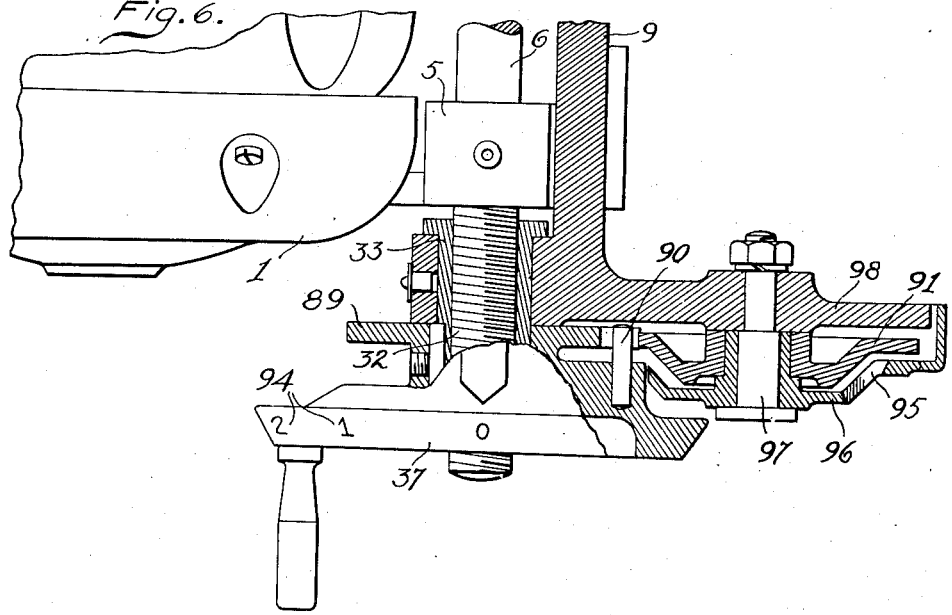
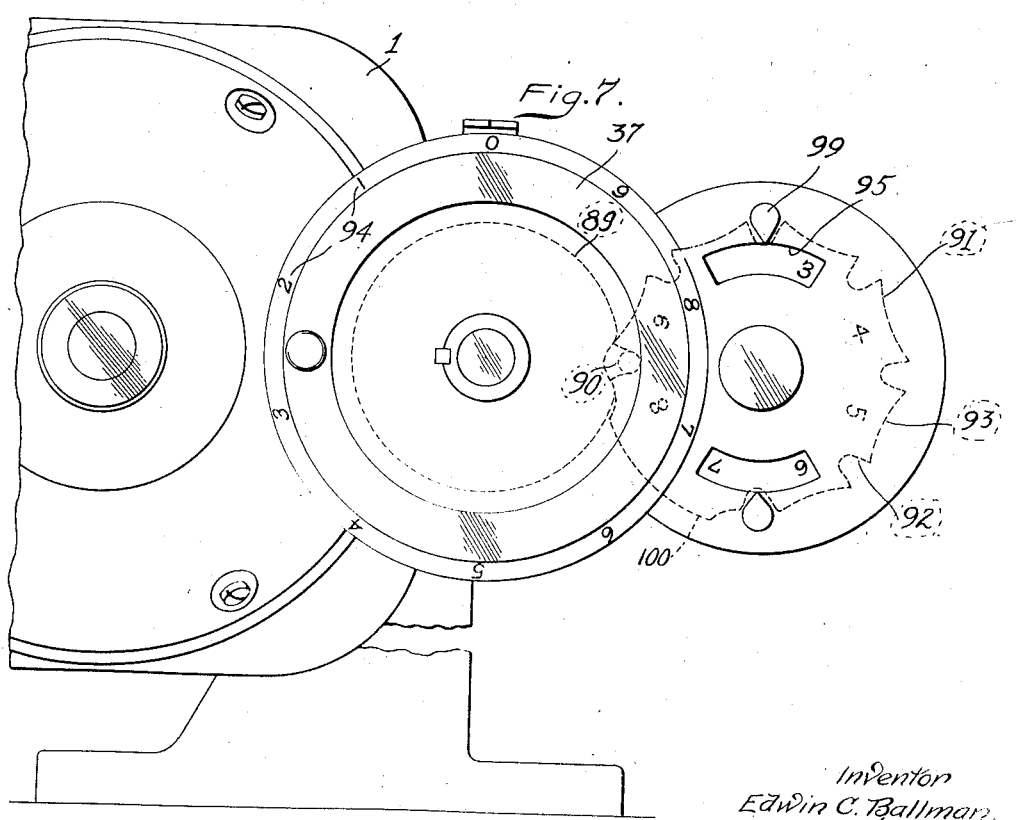
Inventor
Edwin C. Ballman
Bruninga & Sutherland
His Attorneys Patented Oct. 6, 1942

2,297,936

UNITED STATES PATENT OFFICE 2,297,936

VARIABLE SPEED DRIVE

Edwin C. Ballman, St. Louis, Mo.

Application January 2, 1940, Serial No. 312,087

6 Claims. (Cl. 74—230.17)

This invention pertains to variable speed driving mechanism, and more particularly to means for connecting a source of power, such as an electric motor, to a load provided with means for changing the speed ratio between the motor and the load.

One of the objects of this invention is to provide a driving mechanism for connecting a motor or other source of power to its load, said mechanism being adjustable to vary the speed ratio smoothly and without sudden increments between one speed and another.

Another object is to provide such a device employing a simple belt drive and which will automatically adjust itself to a belt of constant length.

Another object is to provide such a device which will automatically adjust the belt tension in accordance with the speed ratio.

Another object is to provide such a device having a variable-diameter V-pulley so arranged as to maintain the belt alignment constant throughout its range of adjustment.

Another object is to provide such a device so arranged that the torque reaction of the motor operates to assist in accomplishing a smooth change in speed ratio.

Further objects will appear from the following description, taken in connection with the accompanying drawings, illustrating one form of mechanism in which this invention may be embodied.

In the accompanying drawings Figure 1 is an end view, somewhat diagrammatic in form, showing the manner of mounting the device and connecting the same to the load.

Figure 2 is an enlarged plan view, partly in section, showing a mechanism embodying this invention, assembled with a motor.

Figure 3 is a detailed plan view of another structure embodying this invention.

Figure 4 is an end view of Figure 3; and

Figure 5 is a side view partly in section of the device of Figure 3.

Figure 6 is a view partly in section of the indicating mechanism shown in Fig. 1.

Figure 7 is an end view of the indicating mechanism.

This invention contemplates the employment in a variable-speed device of a pulley adapted for use with the so-called V-pulley and which is adjustable to vary the effective pulley diameter at which the belt operates. In the following description and the appended claims this device will be termed a "variable-diameter V-pulley."

Referring more particularly to Figure 2 of the drawings, 1 designates a driving motor of any desired type. In the present illustration an electric motor is shown although other types, such, for instance, as a gasoline motor, may be used, with appropriate modifications. The motor 1 has a shaft 2 adapted for connection to the load.

A base or pedestal is provided, indicated generally at 3 in Figure 1. This base is provided with feet 4, upon which the same may stand and which may be attached in any suitable manner to a support to form a secure foundation for the entire mechanism. The base 3 is provided with spaced bearing blocks 5, provided with aligned bores adapted to receive a pivot bar 6. The bar 6 is mounted for rocking movement in the bearings 5, but is secured against endwise movement by a head 7, formed on one end of the bar, and a collar 8 secured thereto on the opposite side of one of the bearings 5.

A supporting bracket 9 is arranged for rocking and sliding movement on the pivot bar 6 and the motor 1 is attached to the bracket 9 in any suitable manner, as by means of bolts 10. In this manner the motor 1 is supported on the bracket 9 so as to be capable of rocking and sliding on the pivot bar 6. The bracket 9 may be provided with a laterally extending arm 11, on which may be mounted a counterweight 12, adapted to partly or wholly counterbalance the weight of the motor 1.

Mounted on the shaft 2 is a variable-diameter V-pulley, comprising a pair of mutually adjustable side flanges 13 and 14. These flanges may be provided, respectively, with hubs 15 and 16, engaging the shaft 2 and keyed thereto for rotation by a key 17. In the arrangement illustrated, the flange 13 is fixed on the shaft 2 by a set-screw 18, while the flange 14 is slidable along the shaft and along the key 17 as a spline, so as to cause rotation of the flange 14 with the shaft. The flanges 13 and 14 are provided with mutually matching fingers 19 and openings 20, adapted to receive the fingers 19 when the flanges are moved toward each other, as indicated by the dotted lines in Figure 2. It will be understood that when the flanges are separated, as shown in full lines in Figure 2, a V-belt 21 may be engaged between them in driving engagement at a small effective diameter, as shown in full lines in Figure 2. When, however, the flanges are moved close together, as indicated in dotted lines, the belt 21 moves outwardly and operates at a greater effective diameter, thereby changing the belt speed when the motor 1 operates at constant speed. The belt 21 may be arranged to engage a driven pulley 22 on a driven shaft 23, arranged to operate any desired load. It will be seen that by changing the spacing of the flanges 13 and 14, the effective diameter at which the belt 21 engages the same may be varied and the speed of the driven shaft 23 will be varied accordingly.

In order to provide for convenient adjustment of the mutual spacing of the flanges 13 and 14, the outer end of the hub 16 may be provided with a suitable bearing, such as a ball-bearing 24, arranged to carry a shifter-ring 25. The ring 25 may be pivoted at 26 in a well-known manner to a fork 27 on the end of a shift lever 28. The lever 28 is pivoted at 29 on the head 17 of the pivot bar 6. The outer end of the lever 28 is pivoted at 30 to a stud 31, adjustably connected with the outer end of the arm 11 of the bracket 9. By this arrangement it will be seen that the lever 28 is connected to the motor mounting in such a manner that when the motor is moved slidably along the bar 6, such movement will carry the outer end of the lever 28 with it, and, accordingly, since the pivot remains fixed, the inner end lever will shift the flange 14 along the shaft 2 in a direction opposite to the direction of movement of the motor along the bar 6. If, further, the arms of the lever 28 between the pivot 29 and the pivots 26 and 30, respectively, are made equal in length, the shifting movement of the flange 14 in one direction will be equal to that of the flange 13 in the opposite direction (since the latter flange moves with the motor); and the alignment of the belt 21 between the flanges will be maintained constant, while the effective diameter at which the belt engages the flanges is changed.

In order to provide for adjustment of the flanges 13 and 14, the right-hand end of the bar 6, as shown in Figure 2, may be provided with a screw thread 32. An internally threaded sleeve 33 is arranged to engage the thread 32. This sleeve is provided with an inner flange 34 arranged to engage a shoulder 35 on an extension 36 of the bracket 9. A hand wheel 37 has its hub 38 mounted on the sleeve 33 and keyed thereto by a key 39. A handle 40 is provided for manipulating the hand wheel. The adjustment of this mechanism may be accomplished by rotating the hand wheel 37 in one direction or the other. Such rotation causes the sleeve 33 to move along the thread 32 and carry with it the bracket 9, which is thereby shifted along the bar 6. This moves the outer end of the lever and also the motor 1, carrying with it its shaft 2 and the flange 13 fixed to said shaft, all these movements being in the same direction and equal in extent. During this movement the lever 28 pivots on the fixed pivot 29, and its lower end moves in a direction opposite to the movement of the motor but to an equal extent, and carries with it the flange 14 which is thereby moved in a direction opposite to the movement of the flange 13 but to the same extent. Accordingly, these two flanges move toward or away from each other equally so that the center line of the belt 21, engaged therebetween, is maintained constant. Of course, when these flanges are moved toward each other, the belt 21 must move outwardly to an increased diameter, and, conversely, when the flanges are separated the belt moves inwardly to a smaller diameter.

In the usual arrangement the counterweight 12 is adjusted so that it does not quite counterbalance the weight of the motor, the difference being supported by the belt 21, as will be seen from Figure 1. As the motor may rock on the pivot bar 6, it may rise and fall, as indicated in dotted lines in Figure 1, so as to accommodate itself to the constant length of the belt 21 when acting at different effective diameters of the variable-diameter V-pulley 13, 14.

In accordance with this invention, the motor is so mounted that the center line of the load shaft 23 is offset with respect to that of the motor. This offset is in the direction toward the pivot bar 6. By this arrangement, when the effective diameter of the V-pulley is increased, the constant length of the belt 21 causes the motor to swing on the pivot-bar 6 to a new position, as indicated in dotted lines in Figure 1. This movement causes an increasing proportion of the motor weight to be transferred to the support 3, and, accordingly, a decreasing proportion thereof is carried by the belt 21. This arrangement, therefore, serves to regulate the belt tension by decreasing the same when the effective pulley diameter is increased, and vice versa. Accordingly, the belt tension is varied in accordance with the load that it has to pull.

The arrangement of Figure 1 is also effective in automatically regulating the belt tension in accordance with the load even at a fixed setting of the effective diameter of the V-pulley. This operates as follows:

The direction of rotation is determined as indicated by the arrow in Figure 1. Accordingly, the torque of the motor 1 is in a clock-wise direction, as shown in Figure 1. As is well-known, in order to exert such a torque, the motor is subject to a reaction torque, or recoil, which is in the opposite direction. Since the motor is free to move about the pivot bar 6, except as restrained by the belt 21, it will tend to rotate, under this reaction torque, about the bar 6 in a counter-clockwise direction, as seen in Figure 1, and this tendency will be resisted by the belt. Accordingly, the greater the torque, the greater will be the reaction which the belt must sustain, and, accordingly, the greater the belt tension.

In order to indicate the speed adjustment, the hand wheel 37 may have mounted thereon a ring 41 having a scale 42 cooperating with a second scale 43 on a stationary head 44 mounted on the bar 6. These scales may be arranged in a relationship similar to that employed in the ordinary micrometer so as to indicate the adjustment of the flanges 13 and 14. In fact, these scales may be calibrated to indicate directly the speed ratios in a given installation.

In the embodiment illustrated in Figures 3, 4, and 5, the arrangement is such that it is not necessary to slide the motor end-wise; instead, both of the pulley flanges 13 and 14 are moved relatively to the shaft 2. This is accomplished by an arrangement of belt crank levers.

Pivoted at 62 on a pair of brackets 63 on the housing of the motor 1 is a bell-crank lever having an arm 64, extending radially inward toward the shaft 2, and the second arm 65 extending at right angles to the arm 64 and axially with respect to the motor 1. This bell-crank also has an outwardly extending arm 66, providing a shift lever operatively connected with a shifter bar 67 slidable in suitable bearings 68 in a bracket 69 of any suitable type mounted on the motor by any suitable means.

The bar 67 may be arranged to be moved endwise by means of an internally threaded sleeve 70 engaging threads 71 on the bar 67 and journaled in one of the bearings 68. The hand wheel 37 may be mounted on and secured to the sleeve 70 for manipulating the latter.

By shifting the bar 67 end-wise by rotating the hand wheel 37, the shifter bar 66 is swung back and forth on its pivot 62 so as to swing the bell-crank lever on its pivot 62. The connection between the arm 66 and the bar 67 may be by a pin-and-slot connection, indicated at 72, so as to provide for relative movement at this point.

The outer end of the arm 65 is provided with gear teeth 80 meshing with similar gear teeth on the arm 81 of a bell-crank lever pivoted at 82 on the brackets 63 and having a radially extending arm 83 similar to the arm 64. The inwardly extending arms 64 and 83 are forked at their inner ends and are pivoted respectively at 84 and 85 to shifter rings 86 and 87. The rings 86 and 87 are mounted by means of ball-bearings 88 on the hubs of the two pulley flanges 13 and 14. It will be seen that by moving the shift lever 66 on its pivot 62 in a direction outwardly away from the motor 1, the arm 64 will move in the opposite direction carrying the flange 14 with it. At the same time, by operation of the gear teeth 80 the bell-crank lever 81, 83, will be swung on its pivot 82 to carry the flange 13 outwardly or away from the flange 14. This movement therefore reduces the effective diameter of the V-pulley. Movement of the lever 66 in the opposite direction will, of course, have the opposite effect of moving the flanges 13 and 14 toward each other and increasing the effective diameter of the pulley. It will be seen that as the movements of the two flanges are alike in extent and opposite in direction, the center line of the belt operating on the V-pulley will be maintained fixed in position, so that the belt is always in proper alignment with the load pulley.

It will be understood, of course, that other mechanisms such as cam-operated mechanisms may be designed to move the flanges 13 and 14. The above-described mechanisms have been found simple and effective, and, what is perhaps more important, economical to manufacture, so that motors may be equipped with this variable-speed drive without excessive cost. It will be seen, therefore, that the invention provides a simple variable-speed drive in which the speed ratio between the driving motor and its load can be varied by a gradual change of ratio without sudden steps. It has been found that by this arrangement a range of variation of about three to one can be obtained in a practical manner. The mechanism is simple and cheap to construct and such as will not easily get out of order.

The arrangement of the motor mounting, shown in Figures 1 and 2, is advantageous not only because it utilizes the torque reaction of the motor to automatically adjust the belt tension according to the load, but, in addition to this, when the pulley diameter is changed, the belt tension is changed correspondingly. This is effective in saving excessive wear on the belt, as the ordinary load requires substantially a constant horse-power, so that the belt tension will decrease as the speed of the load is increased, and this is accomplished automatically by the present arrangement.

In order that the operator may know what speed ratio corresponds to any given setting, the arrangement shown in Figures 6 and 7 provides indicating means for that purpose. In this arrangement the end of the pivot bar 6 is provided with threads 32 engaging corresponding threads in the sleeve 33, as already described. Mounted upon the sleeve 33 is the hand-wheel 37. The hub of the hand-wheel 37 is provided with a disc 89 and a pin 90 cooperating with a star-wheel 91. The wheel 91 may be provided with notches 92 and concave seat portions 93 to cooperate respectively with the pin 90 and the rim of the disc 89 to form a Geneva gear operable in such a way that upon the completion of each revolution of the hand wheel 37, the star-wheel is moved forward one division. At one portion of the rim of the wheel 91 there is formed a convex portion 100 which, by engagement with the rim of the disc 89, provides a stop for the counting mechanism. This also serves to limit the adjusting movement of the sleeve 33 on the screw 32. The wheel 37 may be provided with suitable indicating figures 94, designating fractions of a revolution of the sleeve 33. These figures may be arranged, for instance, from one to ten, as shown in Figure 7. In a corresponding manner the star-wheel 91 may be provided with similar figures. In this case, however, from 3 to 9, as shown in Figure 7, the figures on the star-wheel are visible to the operator through one or more windows 95 in a housing 96, enclosing and protecting the star-wheel. This wheel may be mounted upon a suitable stub shaft 97 on an arm 98 of the bracket 9.

The arrangement of this indicating mechanism is preferably such that with the parts in the position shown in Figure 7, the effective diameter of the V-pulley is at its minimum, say, two inches. As the wheel 37 is turned in a clockwise direction from the position shown in Figure 7, the star-wheel is turned so that during this first revolution the figure 3 on the star-wheel stands opposite the index 99, so that the indication of the pair of wheels may be read as 31, 32, etc. For each revolution of the hand-wheel, the indication of the star-wheel is moved up one figure through 4, 5, and so on to 9. At the final setting when the indication is 90, the effective diameter of the V-pulley is at its maximum, say, six inches. In this manner the indication on the number wheels may be made proportional to the effective diameter of the pulley and therefore proportional to the speed ratio for which the same is adjusted. Accordingly, that speed ratio may be obtained by the operator by multiplying the reading by a constant, the value of that constant depending, of course, upon the size of the driven pulley. In this way the operator may not only change the speed ratio progressively and by small increments, but he may know at all times just what that speed ratio is.

While the invention has been described as embodied in a unitary structure in each embodiment, it will be understood that the various individual features or sub-combinations may be useful by themselves without reference to the complete combination, and that such individual features may be transferred from one embodiment to another. It is understood that this is contemplated by the invention when within the scope of the appended claims.

It is further obvious that various changes may be made in the details of the construction within the scope of the appended claims without departing from the spirit of this invention, and, accordingly, it is not intended that the invention be restricted to the specific details shown and described.

The invention having thus been described, what is claimed is:

1. In a variable-speed device of the character described, a motor having a shaft, a variable-diameter V-pulley having mutually adjustable side flanges mounted on said shaft so as to be movable relatively to each other, a support fixed relatively to the center-line of the belt, and lever means pivoted at a fixed point of said support and operable to move said flanges relatively in order to vary the effective diameter of said pulley while maintaining the belt alignment.

2. A variable-speed motor drive, comprising, a motor having a drive shaft, a variable-diameter V-pulley having mutually adjustable side flanges mounted on said drive shaft, said flanges being movable relatively to each other along the axis of said drive shaft in order to vary the pulley diameter, a control bar mounted in parallel relation to said drive shaft, means for mounting said bar and said motor for axial shift relative to each other, lever means connected with said bar and said motor and organized to move said flanges equally and oppositely upon such shift in order to vary the diameter without changing the belt-alignment of said pulley, and means for shifting said bar and said motor relatively.

3. A variable-speed motor drive, comprising, a motor having a drive shaft, a variable-diameter V-pulley having mutually adjustable side flanges mounted on said drive shaft, said flanges being movable relatively to each other along the axis of said drive shaft in order to vary the pulley diameter, a control bar mounted in parallel relation to said drive shaft, means for mounting said bar and said motor for axial shift relative to each other, equal-armed lever elements connected with said motor and said bar so as to be moved in opposite directions by such shift adapted to move said flanges equally and oppositely in order to vary the pulley diameter without changing the belt-alignment thereof, and means for shifting said bar and said motor relatively.

4. A variable-speed motor drive, comprising, a supporting base, a pivot shaft journaled on said base, a motor bracket pivoted on said shaft and shiftable therealong, a motor mounted on said bracket and having a drive shaft, a variable-diameter V-pulley having mutually adjustable side flanges mounted on said drive shaft, said flanges being movable relatively to each other along the axis of said drive shaft in order to vary the pulley diameter, a lever pivoted on said pivot shaft and pivotally connected to said motor bracket and to move one of said pulley flanges, and adjusting means engaging said pivot shaft operable to shift said motor bracket therealong and thereby operating through said lever to move both said flanges to vary the pulley diameter without changing the belt-alignment thereof.

5. A variable-speed motor drive, comprising, a supporting base, a pivot shaft journaled on said base, a motor bracket pivoted on said shaft and shiftable therealong, a motor mounted on said bracket and having a drive shaft, a variable-diameter V-pulley having mutually adjustable side flanges mounted on said drive shaft, said flanges being movable relatively to each other along the axis of said drive shaft in order to vary the pulley diameter, a lever pivoted on said pivot shaft and pivotally connected to said motor bracket and to move one of said pulley flanges, adjusting means engaging a thread on said pivot shaft and rotatably adjustable thereon to shift said motor bracket therealong and thereby operating through said lever to move both said flanges to vary the pulley diameter without changing the belt-alignment thereof, and counting-wheels connected with said adjusting means and organized to indicate the driving ratio.

6. A variable-speed device of the character described, comprising, a motor, a variable-diameter V-pulley operated thereby, movable means for adjusting said pulley to different effective diameters including an adjusting screw, indicating mechanism including Geneva gearing operating to indicate the number of revolutions and fractions of revolutions of said screw, and a stop segment on said gearing providing a positive stop for said screw.

EDWIN C. BALLMAN.